United States Patent [19]

Stipek et al.

[11] Patent Number: 4,966,739

[45] Date of Patent: Oct. 30, 1990

[54] PROCESS FOR MAKING GYPSUM FIBERBOARD

[75] Inventors: Josef Stipek, Bad Hersfeld; Friedrich Bahner, Rotenburg a.d.G.; Horst Hose, Kassel; Karl Freisinger, Bad Hersfeld; Helmut Eidam, Schenklengsfeld, all of Fed. Rep. of Germany

[73] Assignee: Babcock-Bsh Aktiengesellschaft Vormals Buttner-Schilde-Haas AG, Krefeld, Fed. Rep. of Germany

[21] Appl. No.: 463,916

[22] Filed: Jan. 10, 1990

Related U.S. Application Data

[63] Continuation of Ser. No. 198,945, May 26, 1988, abandoned.

[30] Foreign Application Priority Data

Jun. 6, 1987 [DE] Fed. Rep. of Germany ....... 3719065
Sep. 26, 1987 [DE] Fed. Rep. of Germany ....... 3732497

[51] Int. Cl.$^5$ .................. B29B 15/06; B28B 17/02; B29C 71/00
[52] U.S. Cl. .................. 264/87; 106/783; 156/45; 264/101; 264/118; 264/122; 264/160; 264/333; 264/344; 264/128
[58] Field of Search .................. 264/86, 87, 101, 128, 264/129, 233, 333, 340, 118, 122, 157, 158, 160, 344; 106/109, 110, 111; 156/39, 42, 45

[56] References Cited

U.S. PATENT DOCUMENTS

| | | | |
|---|---|---|---|
| 3,770,859 | 11/1973 | Bevan | 264/333 |
| 4,127,628 | 11/1978 | Uchida et al. | 264/86 |
| 4,239,716 | 12/1980 | Ishida et al. | 264/86 |
| 4,392,896 | 7/1983 | Sakakibara | 264/333 |

FOREIGN PATENT DOCUMENTS

| | | | |
|---|---|---|---|
| 0001063 | 3/1979 | European Pat. Off. | 264/340 |
| 2751473 | 5/1979 | Fed. Rep. of Germany | 264/87 |
| 54-129070 | 10/1979 | Japan | 264/109 |

Primary Examiner—Jeffery Thurlow
Assistant Examiner—Mathieu Vargot
Attorney, Agent, or Firm—Herbert Dubno

[57] ABSTRACT

In the process for making gypsum fiberboard the boards are formed or molded from a mash containing calcium sulfate dihydrate and fiberous material. By heating and subsequently cooling the boards the dihydrate is first converted into the hemihydrate and subsequently recrystallized again to the dihydrate. Known processes require day line setting times which are economically disadvantageous. According to the present invention these times are shortened by pulling or drawing water, an aqueous solution or a water containing mixture through the boards after the cooling step. Advantageously a setting accelerating agent can be dissolved in the water. By these features the setting time can be shortened to less than two hours. By addition of a binding agent, e.g. starch, to the fluid drawn through the boards the strength of the boards is increased.

6 Claims, 2 Drawing Sheets

PROCESS FOR MAKING GYPSUM FIBERBOARD

This is a continuation of co-pending U.S. application Ser. No. 198,945, filed on May 26. 1988, now abandoned.

FIELD OF THE INVENTION

Our invention relates to a process for making gypsum or plaster-of-paris fiberboard (plaster board).

More particularly, the invention relates to a process for making gypsum fiberboard in which a board is formed from a mash containing a calcium sulfate dihydrate and a fibrous material, the mash formed by mixing calcium sulfate dihydrate and the fibrous material together is heated at a temperature between about 115° C. and 180° C. to convert the calcium sulfate dihydrate to a water-poor form of calcium sulfate, especially the hemihydrate, and after that the mashed is cooled and finally exposed to external conditions which convert the water-poor form of the calcium sulfate again into the calcium sulfate dihydrate.

BACKGROUND OF THE INVENTION

In contrast to the conventional process for making gypsum fiberboard in which calcium sulfate dihydrate is used as a starting material, the process described above has some important advantages. In making the mash and in molding the board, the gypsum is present as the dihydrate and is thus not settable. There is thus no concern; without transformation over any setting time and no danger of the production equipment being encrusted or clogged by setting gypsum. Moreover it is possible to feed back waste products or scrap from the manufacturing process. The economic value of the process is limited because the setting process is extremely slow.

This process is described in German Open Patent Application No. 28 16 466. In this process the rehydration occurs as follows: The board resides in a chamber or space in which the humidity or atmospheric moisture content is from 80 to about 100% for a duration of 2 hours to seven days. For accelerated rehydration a setting accelerating agent, e.g. $KAl(SO_4)_2$ can be mixed or added to the rough molded body prior to heating. Also it is possible after heating to apply a setting accelerating agent by soaking.

Extensive experiments have shown that as a practical matter the setting time has an order of magnitude of about one week. However by adding an accelerating agent on average the setting time is somewhat reduced, however the results are disappointingly poor. It has proven up to now to be impossible to attain in a reproducible way a practical lower limit for the setting time or even to approach it.

In German Patent No. 34 19 558, which builds on these processes, the process is provided with a combination of features whereby the setting time is shortened. The mash is adjusted to a pH value which is less than 7 and the molded boards are treated in a pressurized chamber between 3 and 50 minutes in a saturated steam atmosphere at 130° to 170° C. and after that are cooled in the pressurized chamber by releasing steam.

In practice with the process of German Patent No. 34 19 558 one can scarcely guarantee a setting time of less than 50 hours. The slow setting conditions are difficult to explain in view of the fast setting rates which one expects with the hemihydrate. Although a delaying action of the fiber additive has long been known, the extent of this undesirable effect is surprising. Perhaps setting retardant substances unknown up to now are released from the fiber as a result of heating. In comparable processes which operate without fiber additives no similar effect is evident. This can be seen from the following examples.

German Open Patent Application No. 31 17 662 describes a process for making gypsum building blocks in which a calcium sulfate dihydrate raw material is pressed in a moist state, treated hydrothermally at a temperature up to 473K and converted and subsequently cooled. The raw material can contain also diatomaceous earth (Kieselguhr), fly ash and additional additive materials, such as sand. Thus rehydration and recrystallization occur during cooling, apparently in the open, so that the building blocks already have a considerable hardness after cooling. In this respect the building blocks which contain no fiber, behave completely differently from fiberboard.

The German Open Patent Application No. 28 18 169 relates to a process for making gypsum articles, especially facing board or wall boards. These are formed by addition of water to natural gypsum dihydrate, subjecting the boards to a thermal treatment at 100° to 200° C., cooling and moisturizing. The moistening can occur by immersing in water, spraying with water or saturating with steam or water vapor. Subsequently the parts are dried over the course of about three hours. Also these results cannot be transferred to fiber containing boards according to our experience.

The German Open Patent Application No. 26 49 300 teaches a process for making fiberboard like materials based on calcium sulfate dihydrate in which the calcium sulfate dihydrate is mixed with a fibrous material in the presence of water, subsequently molded while being dewatered and then dried at 95° to 140° C. A recrystallization of gypsum is not required.

In this process first a slurry of water, calcium sulfate dihydrate and fiberous material is made and this slurry is mixed with a binding agent, e.g. a completely synthetic binding agent, combined with a modified natural material, e.g. modified starch and carboxymethylcellulose. As a result the union is improved between the gypsum; and the fiber containing material.

Experience has shown that the strengthening action of this additive remains below expectations according to the time and temperature of the heating process. Unsatisfactory results then occur above all when, e.g. according to German Open Patent Application No. 28 16 466, the temperature is raised above the range given in German Open Patent Application No. 26 49 300 to a temperature 180° C. and the heating is performed in an autoclave at an increased pressure until the entire calcium sulfate dihydrate is converted to calcium sulfate hemihydrate.

The reduced action of the binding additive is possibly attributed to the fact that the binding agent is changed by the heat treatment. It is, for example, known that starch under the influence of pressure and temperature is converted into a starch sugar in acid medium in a period of hours.

OBJECTS OF THE INVENTION

It is an object of our invention to provide an improved process for making gypsum fiberboard which avoids the above mentioned disadvantages and difficulties.

It is also an object of our invention to provide an improved process for making gypsum fiberboard which is characterized by a reduced setting time.

SUMMARY OF THE INVENTION

These objects and others which will become more readily apparent hereinafter are attained in accordance with our invention in a process for making gypsum fiberboard in which the board is formed from a mash containing a calcium sulfate dihydrate and a fibrous material comprising heating the mash formed by mixing calcium sulfate dihydrate and the fibrous material together at a temperature between about 115° C. and 180° C. to convert the calcium sulfate dihydrate to a water-poor form of calcium sulfate, especially the hemihydrate, and after that cooling and finally exposing to external conditions which convert the water-poor form of the calcium sulfate again into the calcium sulfate dihydrate.

According to our invention after cooling, an aqueous liquid such as water, an aqueous solution or a water-containing mixture is pulled or drawn or forced through the board, i.e. is forced therethrough.

When this step is incorporated in the known process setting times result which are regularly less than 12 hours. The mechanism of action is still open to further explanation.

Evidently the narrow interstices of the porous board are flushed as it were by the fluid pulled or drawn through the board. Impurities which act to delay setting are flushed out and the fluid contained in the pores in which possible retardant substances are dissolved is replaced by fresh fluid.

The felt-like structure of the board caused by the fiber content acts as a filter so that washing out of fine gypsum particles does not occur.

A considerably shorter setting time of less than two hours can be obtained when a setting accelerating agent is dissolved in the water drawn or pulled through the board. This significant improvement stands in stark contrast to the very modest effect which one obtains when the same accelerating agent is originally mixed in the raw material.

If air is pulled through or drawn through the board after pulling the water or solution through the board, excess water is removed and the subsequent drying is made easy.

Advantageously also after cooling the board, water admixed with a binding agent can be pulled or drawn through so that in a simple way with minor expense a strengthening binding agent can be provided whereby the negative effect of the heating on the action of the binding agent can be completely countered.

Starch can be used as the binding agent however also other phytogenic, animal or synthetic adhesive materials can also be used. A dilute boiling starch can be used so that there is little increase in the viscosity of the water and correspondingly little influence on the passage time of the fluid through the board. Advantageously the concentration of this starch solution is about 40 to 80 g/l.

According to our invention the apparatus for making gypsum fiberboard in a process in which at least one board is formed from a mash containing a calcium sulfate dihydrate and a fibrous material includes a device for drawing water or a water-containing fluid through the boards after the cooling comprising a trough with a sieve like intermediate bottom which is provided at least along at least one edge with a seal and with a drain pipe or outlet pipe connected to the base of the trough. Advantageously the sieve like intermediate body can be provided with a perforated covering layer made of a rubber like material over the entire surface of the intermediate body.

BRIEF DESCRIPTION OF THE DRAWING

The above and other objects, features and advantages of our invention will become more readily apparent from the following description, reference being made to the accompanying highly diagrammatic drawing in which.

DESCRIPTION

Figure 1:
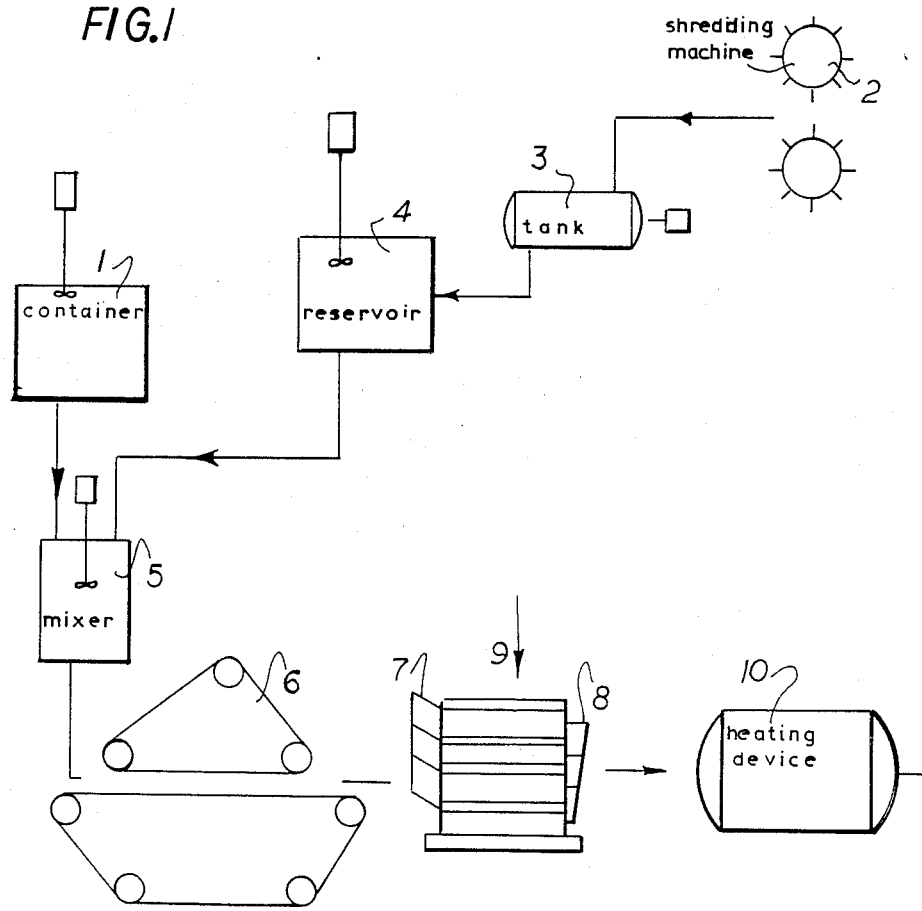
FIG. 1 is a simplified flow chart for the process for making gypsum fiberboard according to our invention in which pictorial representations of the devices used to perform the steps of the process are provided.
Figure 1:
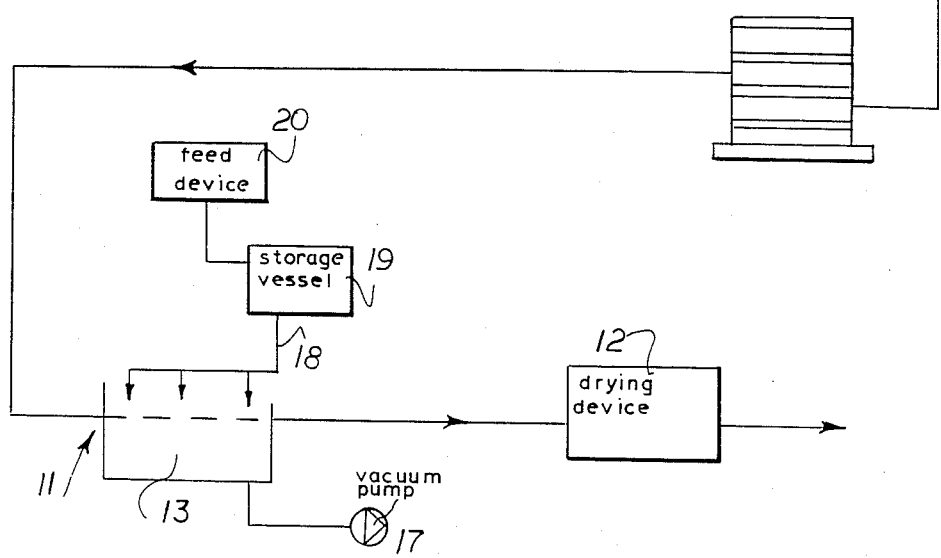
Figure 2:
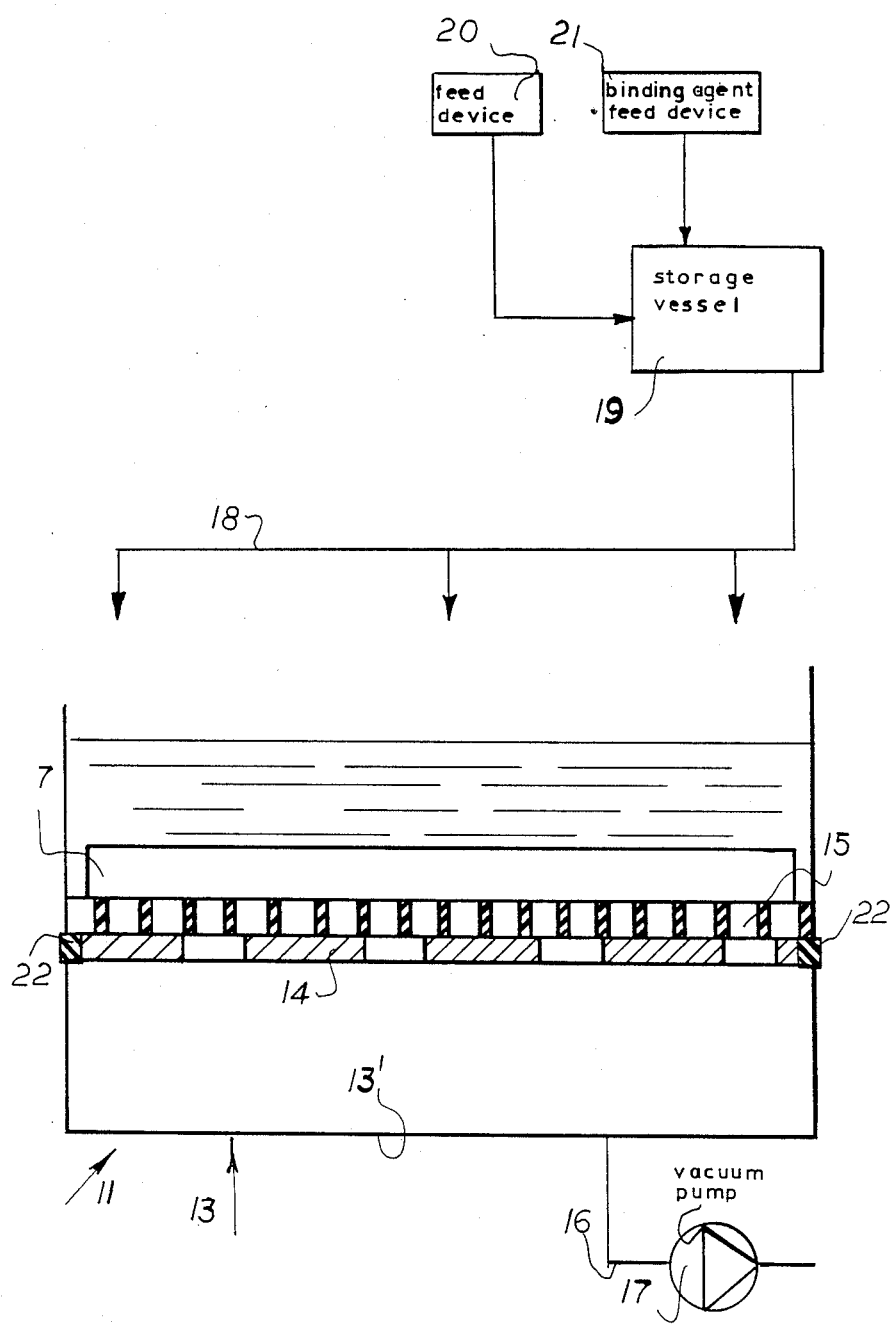
FIG. 2 is an enlarged diagrammatic cross sectional view through the device used to perform the key step in the process illustrated in FIG. 1.

A fine grained calcium sulfate dihydrate, e.g. made by flue gas desulfurization, is mixed with water to form a suspension in a stirred vessel or container 1.

Waste paper, advantageously from newspapers, used as fibrous raw material is fed to a shredding machine 2. The shredded paper produced is worked up to a pulp in a tank 3. Next it is delivered to a reservoir 4 which is provided with a stirring device. The pulp is worked together with the gypsum suspension to form a mash in a mixer 5. The ratio of gypsum to fibrous material used amounts to about 10:1 in terms of the dry material. The water to solid material ratio amounts to about 3:1 to 4:1.

The mash is molded continuously into an endless strip in a shaping machine 6 and then simultaneously mechanically dewatered to a water-solid material ratio of less than about 0.40. The strip is cut into boards 7 with a cutting device (not shown). A stack 9 is formed with the boards 7 with spacer plates 8 interposed. Each spacer plate 8 comprises two plane parallel plates separated by a spacer. The intervening space between the plane parallel plates is open at the edges. The stack 9 is treated in a heating device 10, e.g. an autoclave, for about 30 minutes at a temperature of about 140° to 180° C. in a saturated steam atmosphere and subsequently cooled by removal or release of steam until under 100° C. (see, for example, German Patent No. 34 19 558) thereby releasing setting-retardant impurities as described above.

The cooled boards are then fed to a device 11 for drawing water, an aqueous solution or a water-containing mixture through the boards and then a final drying device 12.

The device 11 for pulling or drawing water, an aqueous solution or a water-containing mixture through the boards and the process step performed by it are of special significance in our invention.

This device 11 comprises a trough 13 in which a rigid perforated intermediate bottom 14 is mounted. A mat like covering layer 15 made of a soft rubber like material which is provided with numerous narrow holes or slots positioned next to each other is positioned on top of the intermediate bottom 14. The trough 13 is connected at its base 13' with a drain pipe or outlet pipe 16 which leads to a vacuum pump 17. A water or solution delivery pipe 18 has a plurality of outlets and extends from a storage vessel 19 positioned above the trough 13.

A feed device 20 for metered delivery or feed of a setting accelerating agent, e.g. calcium sulfate or aluminum sulfate or a mixture of them, is connected with the storage vessel 19. Also a binding agent feed device 21 for metered delivery of starch used as a binding agent to the storage vessel 19 is also provided.

Each individual board is positioned on the perforated covering layer 15 and subsequently covered with an aqueous solution containing about 5% of the setting accelerating agent. The standing fluid is pulled or drawn through the board 7 with a vacuum pump 17. The covering layer 15 acts as a seal preventing a laterally short circuited flow and simultaneously provides for a uniform drawing of water through the boards. A seal 22 can be provided around the edges of the intermediate bottom 14 also. The volume of the water drawn through the board is a multiple of the board volume. The required pressure difference for this amounts to about 0.40 to 0.8 bar according to the board thickness. The entire duration of the vacuum process, e.g. with boards of about 10 mm thickness, is less than 1 minute and is longer with thicker boards.

After the water is pulled through the board 7, the pumps remain in operation for a short period to pull air through the board. The board 7 processed in this way is dried in a final drying device 12 at lower temperatures and set in about a half an hour to at most two hours.

The strengthening effect of adding a binding agent is illustrated by the following example: 40 l/m² of an aqueous solution was drawn through a 1 cm thick gypsum fiberboard. The water drawn through was mixed with starch to form a solution with a concentration of 40 g/l. The bending strength of the board after setting and drying amounted to about 8.5 N/mm². A board made in which no setting agent was mixed in the water drawn through but with the same conditions otherwise had a bending strength of about 6.0 N/mm².

We claim:

1. A process for making gypsum fiberboard comprising the consecutive steps of:
   (a) molding and then cutting boards from a mash containing a calcium sulfate dihydrate and a fibrous material which releases setting-retardant impurities upon heating;
   (b) autoclave heating said mash formed into said boards at a temperature between about 115° C. and 180° C. to convert said calcium sulfate dihydrate to a water-poor form of calcium sulfate and forming setting retardant impurities in said board;
   (c) cooling the heated mash in the form of said boards;
   (d) drawing or forcing an aqueous liquid through said boards subsequent to steps (b) and (c) to remove said setting-retardant impurities; and
   (e) finally exposing said boards to temperature and humidity conditions sufficient to convert said water-poor form of said calcium sulfate again into said calcium sulfate dihydrate thereby setting said boards.

2. The process defined in claim 1 wherein said aqueous liquid contains a setting accelerating agent.

3. The process defined in claim 1 wherein after drawing or forcing said aqueous liquid through said board air is drawn or forced through said board.

4. The process defined in claim 1 wherein said aqueous liquid has a binding agent admixed therewith.

5. The process defined in claim 4 wherein a dilute boiling starch solution is added to said aqueous liquid to provide said binding agent.

6. The process defined in claim 5 wherein the concentration of said starch solution is about 40 to 80 g/l.

* * * * *